United States Patent [19]

Hansen, Sr.

[11] 4,113,399
[45] Sep. 12, 1978

[54] KNOB SPRING

[76] Inventor: Wray C. Hansen, Sr., 8755 W. 73rd Pl., Arvada, Colo. 80002

[21] Appl. No.: 773,523

[22] Filed: Mar. 2, 1977

[51] Int. Cl.² ............................................. F16D 1/06
[52] U.S. Cl. ................................ 403/329; 403/361; 16/118; 74/553
[58] Field of Search ...................... 403/357, 361, 329; 16/121, 118; 74/553, 548; 292/353, 349

[56] References Cited

U.S. PATENT DOCUMENTS

| 2,149,746 | 3/1939 | Pfeiffer | 403/357 |
| 2,670,227 | 2/1954 | Green | 403/357 |
| 2,815,230 | 12/1957 | Howie | 403/361 X |
| 3,130,990 | 4/1964 | Leitmann | 403/361 X |

Primary Examiner—Andrew V. Kundrat
Attorney, Agent, or Firm—Sheridan, Ross, Fields & McIntosh

[57] ABSTRACT

A generally H-shaped knob spring is provided which comprises two flat members joined by a center bowed member. The spring is received in an undercut slot adjacent one side of a recess in a knob for receiving the end of a shaft, the bowed portion extending into the recess. When the shaft is inserted in the recess, the bowed portion of the spring is flattened out causing the end strips to be bent to bite into the surface of the slot and the surface of the shaft adjacent the slot wherein the spring releasably grips the knob and the shaft to hold the knob securely on the shaft so that it does not wobble or twist thereon.

4 Claims, 8 Drawing Figures

KNOB SPRING

DESCRIPTION OF THE PRIOR ART

1. Field of the Invention

This invention relates to a leaf spring for holding a knob in place on the end of a shaft, and more particularly to a leaf spring which will hold the knob on the shaft securely without wobbling.

2. Description of the Prior Art

Various types of springs for holding a knob on the end of a shaft have been devised. Some of these springs extend around the peripheral surface of the shaft end. Others have complex configurations which may be difficult to manufacture and therefore are quite costly. Some of the configurations allow considerable play between the shaft and the knob which is undesirable and which can result in the knob coming off of the shaft.

Leaf springs of various configurations have also been provided. One of these is shown in U.S. Pat. No. 2,149,746 to Pfeiffer. This spring, however, allows considerable play between the knob and the shaft which can result in the knob twisting and coming off of the shaft end. Also, it is of somewhat complex and hence costly configuration.

SUMMARY OF THE INVENTION

In accordance with this invention, a leaf spring is provided which is received in a slot in a knob, and has a bowed portion extending into a recess in the knob for receiving a shaft. The bowed portion is flattened upon insertion of the shaft causing the edges of the leaf spring to grippingly engage the slot and the surface of the shaft to releasably attach the knob to the shaft.

More particularly, a generally H-shaped spring is provided which has a pair of spaced flat strips interconnected by a bowed center. This spring is receivable in an undercut slot at one side of the recess in a knob, the slot having a width greater than that of the recess so that the ends of the strips are received in this undercut portion and the bowed center extends into the recess. When the shaft is inserted in the recess of the knob, the bowed portion of the spring is flattened, causing the strips to rotate or turn so that the edges thereof dig into the edges of the slot and into the adjacent surface of the end of the shaft to grippingly hold the knob in place on the shaft.

Additional advantages of this invention will become apparent from the description which follows, taken in conjunction with the accompanying drawings.

DESCRIPTION OF THE PREFERRED EMBODIMENT

Figure 1:
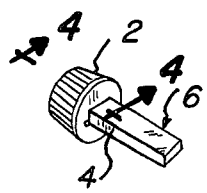
FIG. 1 is a perspective view of a knob attached to the end of a shaft in accordance with this invention.
Figure 2:
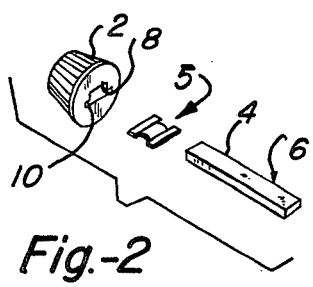
FIG. 2 is an exploded view of the shaft knob and spring of FIG. 1, showing the relative orientation of the parts.

In accordance with this invention, a knob 2 is adapted to be received on the end 4 of a shaft 6, as best seen in FIG. 1. Conveniently, knob 2 has a rectangular recess 8 therein for receiving the correspondingly shaped rectangular end 4 of shaft 6.

Figure 3:
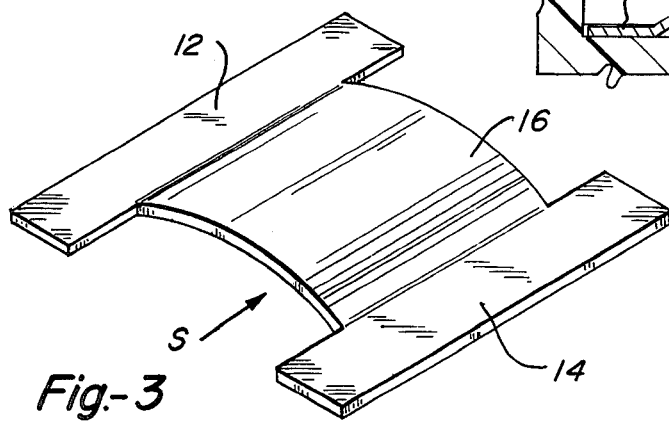
FIG. 3 is a greatly enlarged perspective view of the spring of FIG. 2.

Conveniently, a slot 10 is undercut along one edge of recess 8 and is wider than recess 8 as shown to form guide ways for receiving leaf spring S, as best seen in FIG. 3.

Leaf spring S comprises twospaced parallel flat rectangular strips 12 and 14 which are interconnected by a bowed center portion 16. As can be seen, the ends of strips 12 and 14 extend laterally outwardly beyond center section 16 and when spring S is inserted in slot 10 these ends engage the undercut portion of the slot which serves as a guide way for guiding the spring into position. Advantageously, the spring is symmetrical and, therefore, can be reversed when inserted in slot 10.

Figure 4:
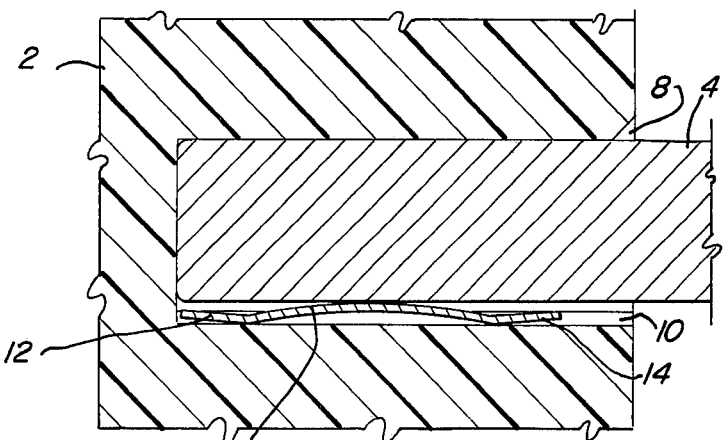
FIG. 4 is a longitudinal section, taken along line 4—4 of FIG. 1, and on a greatly enlarged scale, showing a portion of the knob and the position of the spring when the knob is attached to the shaft.
Figure 5:
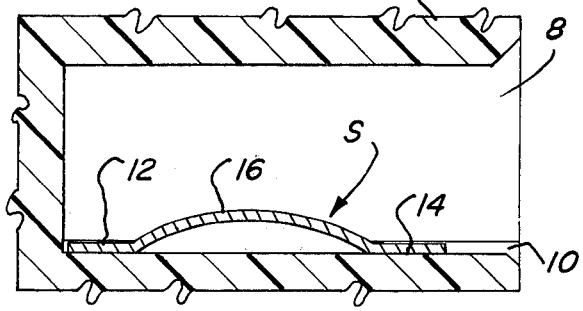
FIG. 5 is a longitudinal section, similar to FIG. 4, but showing a portion of the knob and the position of the spring when the knob is removed from the shaft.
Figure 6:
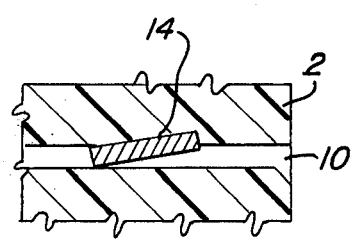
FIG. 6 is an enlarged fragmentary section of a portion of FIG. 4, showing the manner in which the leaf spring grippingly engages the knob and the shaft.

The spring is positioned in the slot so that bowed center portion 16 extends into recess 8, as best seen in FIG. 5. When shaft end 4 is inserted in recess 8 the surface of the shaft engages bowed portion 16 causing it to be flattened as shown in FIG. 4 and also causing strips 12 and 14 to be turned or twisted so that the outer edge of each digs into the side of slot 10, as best seen in FIG. 6, and the portion of the strips which extends across the center of recess 8 will also dig into the surface of shaft end 4, thereby creating a gripping engagement between the shaft end and the knob through the contacting surfaces of the ends of strips 12 and 14. Also, the resilient force created by the flattening of center portion 16 holds the opposite face of shaft end 4 firmly against the inside of recess 8 so that the shaft cannot rock or twist within the knob.

Figure 8:
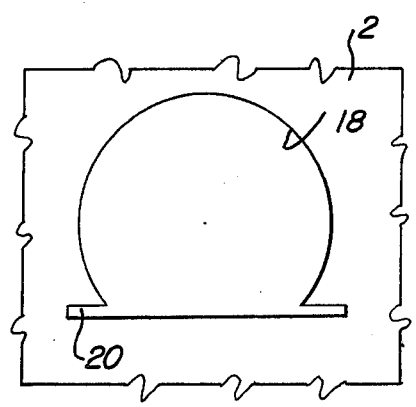
FIG. 8 is a fragmentary end-view, similar to FIG. 7, but showing the knob having a modified recess configuration for receiving a shaft with a similar cross-sectional configuration.
Figure 7:
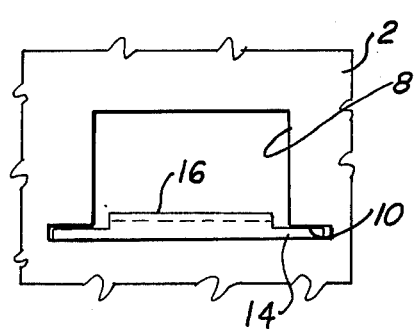
FIG. 7 is a fragmentary front-end view of the knob in FIG. 5 showing a rectangular recess for receiving a shaft having a rectangular cross-section and showing the position of the spring in the knob.

An alternative knob 2' is shown in FIG. 8, having a recess 18 for receiving a shaft having a half-round end. This knob also includes an undercut slot 20 for receiving spring S therein, as described above.

From the foregoing, the adventages of this invention are readily apparent. A leaf spring has been provided for use in a knob having an undercut slot which grippingly engages both the knob and the shaft for holding the shaft releasably secured within the knob. Furthermore, the spring exerts a resilient force on the side of the shaft end holding it securely in the knob recess so that it cannot rock or twist.

The invention has been described in detail with particular reference to preferred embodiments thereof, but it will be understood that variations and modifications can be effected within the spirit and scope of the invention.

What is claimed is:

1. A knob spring for releasably attaching a knob to a shaft end wherein said knob has a recess having a configuration corresponding to that of the shaft end for receiving the shaft end therein and the knob further includes a slot undercut along one edge of the recess and extending beyond the edges of the recess providing guide ways for receiving the ends of the springs, said spring comprising:

a pair of spaced flat parallel strips lying in a plane and having a length substantially equal to the width of the slot so that said strips can be slidingly received in said slot; and a bowed center member interconnecting said strips, said center member having a width substantially less than the length of said strips to form a leaf spring having a generally H-shaped configuration, said spring being slidable into said slot with the ends of said strips engaging the guide ways formed by said slot and said center bowed portion extending into said recess for engagement by an adjacent surface of the shaft end;

said bowed portion being dimensioned so that upon insertion of said shaft end in said recess the bowed portion will be flattened causing said strips to twist out of the plane so that the edges thereof grippingly engage said slot and the adjacent surface of said shaft end to releasably hold said shaft in said knob so that said knob does not wobble or twist on said shaft end.

2. A knob and retaining spring in combination comprising:

a knob having a recess in one end thereof having a configuration for receiving the end of a shaft having a similar configuration, one surface of said recess being flat;

an undercut slot formed adjacent said flat surface of said recess and extending outwardly beyond said recess to form guide ways for receiving the ends of said spring;

a spring received in said slot having a pair of spaced flat parallel rectangular members lying in a plane; and a center bowed section interconnecting said parallel strips and extending into said recess, said bowed portion being dimensioned so as to be flattened by the insertion of a shaft end into said recess to cause said strips to be twisted out of the plane so that the edges thereof gripplingly engage the guideways of said slot and the corresponding flat surface of said shaft end to releasably hold said knob on said shaft end without wobbling or twisting thereon.

3. The combination, as claimed in claim 2, wherein: said recess is generally rectangular.

4. The combination, as claimed in claim 2, wherein: said recess is generally D-shaped in configuration, having a flat surface adjacent said slot for receiving a shaft end having a D-shaped configuration.

* * * * *